United States Patent [19]

Saeva et al.

[11] 3,947,184

[45] Mar. 30, 1976

[54] IMAGING METHOD

[75] Inventors: Franklin D. Saeva, Webster, N.Y.; Patrick E. Sharpe, Ann Arbor, Mich.

[73] Assignee: Xerox Corporation, Stamford, Conn.

[22] Filed: Nov. 14, 1974

[21] Appl. No.: 523,597

[52] U.S. Cl. .......................... 350/160 LC
[51] Int. Cl.² ............................ G02F 1/28
[58] Field of Search ................... 350/160 LC

[56] References Cited
UNITED STATES PATENTS 3,728,008    4/1973    Allen et al. ............. 350/160 LC
3,795,516    3/1974    Stahr et al. ............. 350/160 LC

OTHER PUBLICATIONS

Noll, W., *Chemistry and Technology of Silicones*, Academic Press, New York, 1968, pp. 190-198, pp. 443-446, pp. 579-581.

Uchida, T., Watanabe, H., Wada, M., "Molecular Arrangement of Nematic Liquid Crystals", *Japanese Journal of Applied Physics*, Vol. 11, No. 10, Oct. 1972, pp. 1559-1565.

Primary Examiner—John K. Corbin
Assistant Examiner—R. Hille
Attorney, Agent, or Firm—James J. Ralabate; Michael H. Shanahan; George J. Cannon

[57] ABSTRACT

A nematic liquid crystalline composition having positive dielectric anisotropy is provided in the homeotropic texture by contact with a layer of an electrically insulating polysiloxane elastomer. An electrical field is then applied parallel to the molecular axes of the nematic resulting in reorientation of the nematic molecules.

25 Claims, 2 Drawing Figures

IMAGING METHOD

BACKGROUND OF THE INVENTION

This invention relates to electro-optic imaging and, more specifically, to electro-optic imaging wherein a nematic liquid crystalline composition is imaged by applying an electrical field.

Recently, there has been substantial interest in the discovery of more useful applications for the class of substances known as "liquid crystals". The name liquid crystals has become generic to liquid crystalline materials which exhibit dual physical characteristics, some of which are typically associated with liquids and others which are typically unique to solids. Liquid crystals exhibit rheological characteristics, such as viscosities, which are normally associated with liquids. The optical characteristics of liquid crystals are more similar to those characteristics ordinarily unique to crystalline solids.

In liquids or fluids, the molecules are typically randomly distributed and oriented throughout the mass of the material. Conversely, in crystalline solids the molecules are generally rigidly oriented and arranged in a specific crystalline structure. Liquid crystals resemble solid crystals in that the molecules of the liquid crystalline compositions are regularly oriented in a fashion analogous to, but less extensive than, the molecular orientation and structure in a crystalline solid. Many substances have been found to exhibit liquid crystalline characteristics in a relatively narrow temperature range; below the temperature range the substances typically appear as crystalline solids, and above that temperature range they typically appear as liquids. Liquid crystals are known to appear in three different mesomorphic forms; the smectic, the nematic and cholesteric. In each of these structures, the molecules are typically arranged in a unique orientation.

In the nematic liquid crystalline mesophase structure, the major axes of the molecules lie approximately parallel to each other, but the molecules are typically not specifically organized in any other fashion.

Nematic liquid crystals are known to be responsive to electrical fields, and have been used in various electro-optic cells and imaging systems, for example as disclosed in Williams U.S. Pat. No. 3,322,485; Freund et al., U.S. Pat. No. 3,364,433; Heilmeier et al., U.S. Pat. No. 3,499,112; and Goldmacher et al., U.S. Pat. No. 3,499,702. Most of the known nematic liquid crystalline light valves and display devices make use of the dynamic light scattering characteristics of layers of nematic liquid crystalline materials which have electrical fields placed across the thickness of the layer.

In the cholesteric structure, the molecules are believed to be arranged in definite layers as in the smectic structure; however, within a given layer, the molecules are believed to be arranged with their major axes approximately parallel in a fashion resembling the structure of nematic liquid crystals. Because the major axes of the molecules in the cholesteric structure are believed to be parallel to the planes of the layers, the molecular layers are very thin. The cholesteric structure derives its name from the fact that materials exhibiting the cholesteric liquid crystalline structure typically have molecules which are derivatives of cholesterol or which are shaped very similarly to molecules of cholesterol. Because of the shape of the cholesteric molecule; in the cholesteric structure the direction of the major axes of the molecules in each of the aforementioned thin layers is displaced slightly from the direction of the major molecular axes in the adjacent molecular layers. When compared to a hypothetical straight line axes passing through a cholesteric liquid crystalline substance and perpendicular to the molecular planes within said substance, the angular displacement of the direction of the molecular axes within each adjacent molecular layer traces out a helical path around the hypothetical straight line axes.

Cholesteric liquid crystals are known to be responsive to electrical fields (see Harper, W. J., "Voltage Effects in Cholesteric Liquid Crystals," in *Molecular Crystals*, Vol. 1, 1966, pages 325–332). The effects of an electrical field upon a sample of a liquid crystalline substance have typically been observed in a cell comprising a film of liquid crystals sandwiched between transparent electrodes, as disclosed, for example in U.S. Pat. No. 3,804,618 and French Pat. No. 1,484,584. U.S. Pat. No. 3,652,148 to Wysocki et al discloses the application of an electrical field to transform a cholesteric liquid to a nematic liquid crystalline structure.

Haas et al., U.S. Pat. 3,687,515 discloses an electro-optic system wherein a layer of spontaneously homeotropic textured optically uniaxial nematic liquid crystalline composition with the optic axis normal to the plane of the layer was rendered optically biaxial by the application of an electrical field perpendicular to the uniaxial optic axis. When the field is removed, the composition naturally relaxes back into its optical uniaxial, homeotropic texture. Copending application U.S. Ser. No. 349,497 filed Apr. 9, 1973 discloses the use of electrical fields to drive an optically uniaxial nematic between two orientations approximately 90° apart. Each applied electrical field is applied normal to the optic axis and, hence, the molecular axes of the uniaxial nematic.

Further, the use of aligning agents, including silanes are known in the art for aligning liquid crystalline materials, including the alignment of nematics in either the nematic homeotropic or nematic homogeneous texture. See, for example, F. J. Kahn, "Orientation Liquid Crystals by Surface Coupling agents," *Appl. Phys. Lett.*, Vol. 22, No. 8, Apr., 15 1973.

The application of electrical fields to nematics has heretofore been limited to applying the electrical field in a direction which is normal to the net dipole moment of the molecules so that the molecules will be re-oriented by the applied field. That is, a nematic having negative dielectric anisotropy has a net dipole moment substantially perpendicular to the molecular axis substantially normal to the net dipole moment. The net dipole moment aligns with the direction of the applied electrical field and hence the molecular axes of the negative dielectric anisotropy nematics becomes substantially aligned with the applied electrical field. Conversely, positive dielectric anisotropy nematics have net dipole moments substantially parallel to the molecular axes of the nematic. Therefore, positive dielectric anisotropy nematics align in an electrical field with both the molecular axes and the net dipole moment substantially parallel to the direction of the applied electrical field.

SUMMARY OF THE INVENTION

It is, therefore, an object of this invention to provide a novel imaging method.

It is another object of this invention to provide a novel electro-optic imaging method.

It is another object of this invention to provide a novel liquid crystalline imaging method.

It is still another object of the invention to provide a novel method of obtaining an electro-optic effect.

The foregoing objects and others are accomplished in accordance with this invention by providing in homeotropic alignment a layer of nematic liquid crystalline composition having a positive dielectric anisotropy by contacting the nematic with an electrically insulating polysiloxane elastomer layer and, applying an electrical field across the nematic composition in a direction parallel to the optic axis, and hence the molecular axes, of the homeotropically aligned positive dielectric anisotropy nematic. Surprisingly, and unexpectedly the electrical field applied parallel to the molecular axes of the homeotropically aligned nematic results in a reorientation of the molecules under the influence of the applied electrical field.

BRIEF DESCRIPTION OF THE DRAWINGS

For a better understanding of the invention, as well as other objects and further features thereof, reference is made to the following detailed disclosure of preferred embodiments of the invention taken in conjunction with the accompanying drawings thereof, wherein.

DESCRIPTION OF THE PREFERRED EMBODIMENTS

Figure 1:
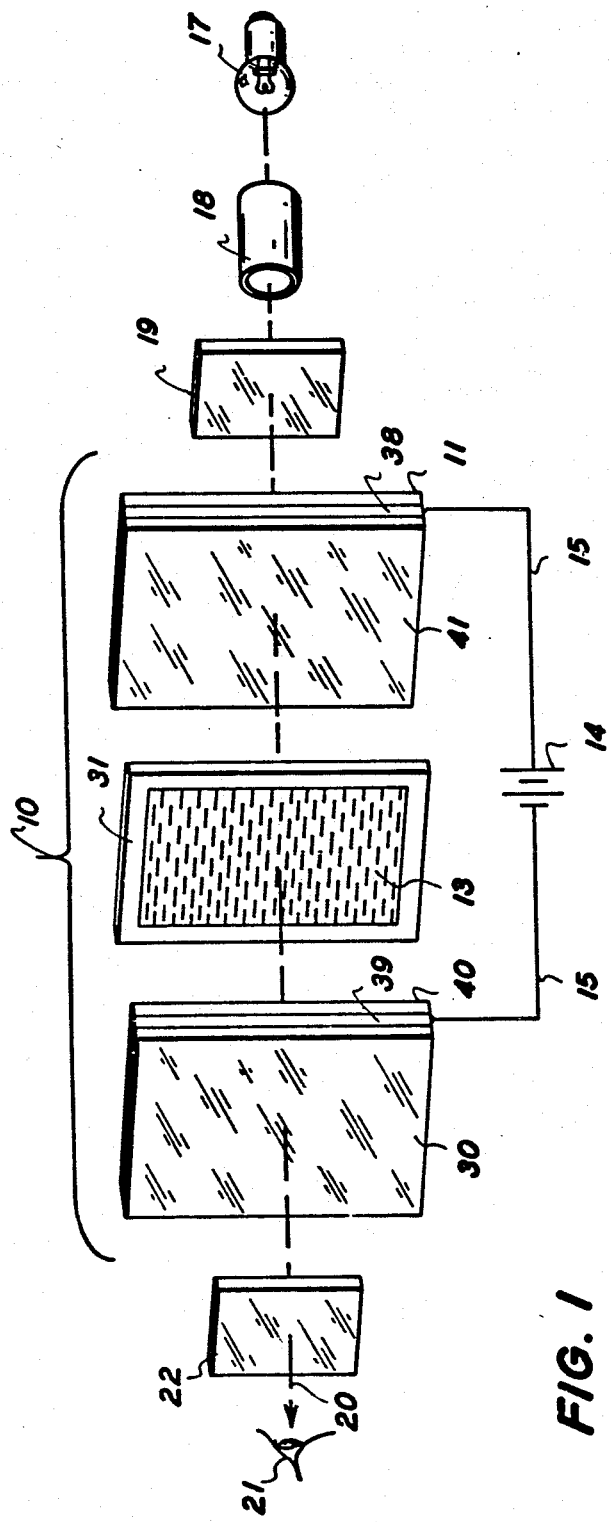
FIG. 1 is a partially schematic, exploded isometric view of an embodiment of the present invention.

In the FIG. 1 embodiment, an electro-optic cell 10 comprises a pair of overcoated substantially transparent plates 11 and 30 separated by a void containing spacer 31, and the layer of nematic liquid crystalline composition 13 having positive dielectric anisotropy occupies the void of spacer 31. Substantially transparent plate 30 is overcoated with substantially transparent conductive coating 39 and insulating layer 40 comprising a polysiloxane elastomer composition. Substantially transparent plate 11 is overcoated with substantially transparent conductive coating 38 and insulating layer 41 comprising polysiloxane. Images formed in accordance with the practice of the present invention, can be viewed in transmission with the aid of polarizers 19 and 22, collimator 18 and light source 17.

In operation, the electro-optic cell 10 is typically connected to the voltage source 14 by leads 15. Voltage source 14 may be either D.C., A.C. or a combination of D.C. and A.C. The voltage source results in an application of an electrical field between the conductive coatings 38 and 39 and, therefore, across the layer 13 of nematic liquid crystalline composition having positive dielectric anisotropy. Voltage source 14 is preferably selectively activated such as, for example, by an electrical switch when application of the electrical field is desired.

In the electro-optic cells described herein, the substantially transparent plates 11 and 30 may comprise any suitable substantially transparent material. Preferably, the plates 11 and 30 are at least semi-transparent; i.e., glass, polyethylene; polyvinylchloride; Mylar, a polyester resin film available from DuPont; Teflon, a polytetrafluoroethylene film available from DuPont; or any other suitable substantially transparent material may be used.

The conductive coatings 38 and 39 constitute electrodes and may comprise any suitable electrically conductive material. Such electrical conductors will preferably have electrical resistivities in the range between about $10^{-8}$ and about $10^{-3}$ ohm-cm, although materials having resistivities outside this range will perform satisfactorily. Typical conductive materials suitable for use as electrodes herein include aluminum, copper, silver, gold, tin oxide, chromium, indium, indium oxide and others. The thickness of the electrodes is typically not greater than about 250 microns. The individual cells in the present invention are typically of width not greater than about 50 millimeters. Within this range thin (about 1 to about 100 microns thick) individual cells or combinations thereof are preferably for use in high resolution imaging or display systems.

Where it is desirable to use a gasket-like material to seal the electro-optic cell, any suitable substantially electrically insulating material may be used. Preferred gasket materials will typically be chemically inert and possess appropriate dielectric characteristics. Materials suitable for use as insulating materials include cellulose acetate, cellulose triacetate, cellulose acetate butyrate, polyurethane elastomers, polyethylene, polypropylene, polyesters, polystyrene, polycarbonates, polyvinylfluoride, polytetrafluoroethylene, polyethylene, terephthalate, mixtures thereof, and others. These materials are also used for spacer 31. The use of spacer 31 is optional. Also, one of layers 40 and 41 may be formed in spacer configuration by being provided with side walls to retain the liquid crystalline composition and to seal the cell.

The nematic liquid crystalline composition having positive dielectric anisotropy can comprise any suitable nematic liquid crystalline material having positive dielectric anisotropy, or a mixture of nematic liquid crystalline materials with materials having positive dielectric anisotropy, or a mixture of positive and negative dielectric anisotropy nematics which yield a net positive dielectric anisotropy nematic composition.

Typical suitable nematic liquid crystalline materials having positive dielectric anisotropy are well known in the liquid crystalline art and need not be listed in detail herein. These include cyanoaniline compounds such as p-hexyloxybenzylidene-p'-cyanoaniline and p-heptyloxybenzilidene-p'-cyanoaniline disclosed by M. Schadt and W. Helfrich in *Appl. Phys. Lett.*, 18, 127 (1971); nematic esters such as p-cyanophenyl-P-butylbenzoate and p-cyanophenyl-p-heptylbenzoate, both available from Aldrich Chemical Company; and butyl-p, p-ethoxyphenoxycarbonylphenyl carbonate, available from Eastman Chemical Products, Inc.

Typical suitable materials having positive dielectric anisotropy include smectic liquid crystalline materials having positive dielectric anisotropy such as p-methoxybenzylidene-p'-trifluoromethylaniline and p-heptyloxybenzylidene-p'-trifluoromethylaniline. These materials can be conveniently prepared by starting with about 0.10 mole of either p-methoxybenzylidene or p-heptyloxybenzaldehyde, depending upon the product desired. The starting compound is refluxed with p-trifluoromethylaniline for about 4 hours in about 100 cc of absolute ethanol to which a trace of p-toluenesulfonic acid is added. The water produced in the reaction is removed by azeotroping over the 95% ethanol into a Dean-Stark trap. The reaction mixture is allowed to cool to room temperature and the crude product is crystallized from solution. The resulting product is recrystallized from hexane and yields about 0.06 moles of purified product. The purified p-methoxybenzylidene-p'-trifluoromethylaniline is mesomorphic from about 50° to about 87°C, and the purified p-heptyloxybenzylidene-p'trifluoromethylaniline is mesomorphic from about 38° to about 82°C.

The positive dielectric anisotropic materials, including positive dielectric anisotropic smectics, to be added to nematic liquid crystalline materials can be added in any amount so long as the resulting composition retains the nematic mesomorphic state. Similarly, when mixtures of positive and negative dielectric anisotropic nematics are to be utilized, the amount of negative dielectric anisotropic nematic can be added in any amount so long as the resulting composition has a net positive dielectric anisotropy. Negative dielectric anisotropy nematic liquid crystalline materials are well known in the art and need not be listed in detail herein. Typical suitable negative dielectric anisotropy nematic liquid crystalline materials include N-(p-methoxybenzilidene)-p-butylaniline (MBBA); p-azoxyanizole (PAA); N-(p-ethoxybenzylidene)-p-butylaniline (EBBA); dl-4-(2-methylhexyl)-4'-ethoxy-α-chlorotransstilbene; pp'-methoxypentyltolane, ethoxybenzylidene-p'-aminophenyl-3-methyl valerate, and trans-4-butyl-α-chloro-4'-ethoxystilbene.

Layers 40 and 41 can comprise any electrically insulating polysiloxane elastomer. Typical suitable polysiloxane elastomers include either homo- or copolymers of disiloxanes. Generally speaking, typical suitable siloxane homopolymers are represented by the formula

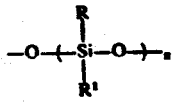

and typical suitable siloxane copolymers are represented by the formula

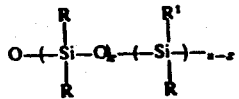

where, for the homopolymer, R and $R^1$ are selected from the group consisting of alkyl and aryl where R may or may not equal $R^1$ and where, for the copolymer, $R^1$ does not equal R and R and $R^1$ are selected from the group consisting of alkyl and aryl. Preferably, the alkyls have from about 1 to about 20 carbon atoms. Typical suitable polysiloxane elastomer compositions for layers 40 and 41 include: polydialkylsiloxane such as polydimethyl siloxane, polydiethyl siloxane, and polydibutyl siloxane; polydiaryl siloxanes such as polydiphenyl siloxane, polydinaphthyl siloxane, and polydianthryl siloxane; and polyalkylaryl siloxanes such as polymethylphenyl siloxane, polybutylphenyl siloxane, polymethylnaphthyl siloxane, polyethylnaphthyl siloxane, and polybutylnaphthyl siloxane.

Layers 40 and 41 are preferably from about 2 to about 20 microns thick and can be conveniently formed by dissolving the polysiloxane composition in an organic solvent such as, for example, benzene, dioxane, tetrahydrofuran. The solution can be applied to the electrodes by any conventional technique such by spraying, roll coating, reverse roll coating, kn edge coating and other suitable techniques. After solution is applied to the electrode, the organic sol is evaporated by, for example, air drying resultin the formation of layers 40 and 41 of the polysilox composition.

Exemplary of suitable polysiloxane elastomers those having only methyl containing groups in the p mer chain such as polydimethyl siloxane; elastor having both methyl and phenyl containing groups ir polymer chain as well as elastomers having both me and vinyl groups, methyl and fluorine groups methyl, phenyl and vinyl groups in the polymer cl Typical suitable elastomers include the therm curable type, including Syl Gard No. 182, Syl Off 22 and No. 23 manufactured by Dow Corning, land, Michigan; Y-3557 and Y3602 available Union Carbide Company, New York, New Yor well as No. 4413 and No. 4427 available from Ge Electric Company, Waterford, New York. Y-3557 Y-3602 specifically have aminoalkane crosslir sites in the polymer backbone which react with a cyanate crosslinking agent over a wide range of perature and time to produce a durable, elastor film.

As is seen in FIG. 1, the advantageous effect present invention is typically observed through an lyzer or polarizer with linearly polarized and collir light. The light is preferably monochromatic. source of light may intrinsically emit polarize collimated light such as, for example, lasers; in case only the one polarizer 22 is needed. Or, the source may be either a monochromatic or white source of light passed through a collimator 18 tioned normal to the plane of the layer 13 of crystalline composition. The collimated light i passed through a polarizer 19 and the plane pol light, here transmitted along line 20, enters the e optic cell perpendicular to the optic axis of the crystalline composition in layer 13. The liquid c line composition in layer 13, under the home cally aligning influence of the layers 40 and 41 optically uniaxial and has its optic axis perpendic the plane of layer 13. An observer 21, on the o side of the electro-optic cell, observing the cell t polarizer 22, oriented 90° with respect to polari in the direction normal to the plane of layer parallel to the optical axis of liquid crystalline co tion in layer 13, will observe that the field of dark. The electro-optic cell is in its "OFF" state. To turn the electro-optic cell to its "ON" state, the voltage is switched on to create an el field between electrode 39 and electrode 38. T axis of liquid crystalline composition 13, now u influence of the parallel electrical field, has i axis, and its molecular axes, re-oriented from tion normal to the plane of layer 13 to anothe tion. If the observer 21 were to view the elect cell as he did previously, his direction of vie parallel to the optic axis of the liquid compo layer 13, in areas of the applied electrical field observer will find that the field of view is brigh of the applied electrical field. The electro-opti therefore, on its "ON" imaging state.

Preferred field strengths are from about $10^3$ $10^5$ volts per centimeter; preferred electrode t is from about 50A to about 10 microns; and layer thickness for the liquid crystalline composition is from about 1 micron to about 50 microns. The applied potential used in creating the electrical fields may be either D.C., A.C. or combinations thereof.

Figure 2:
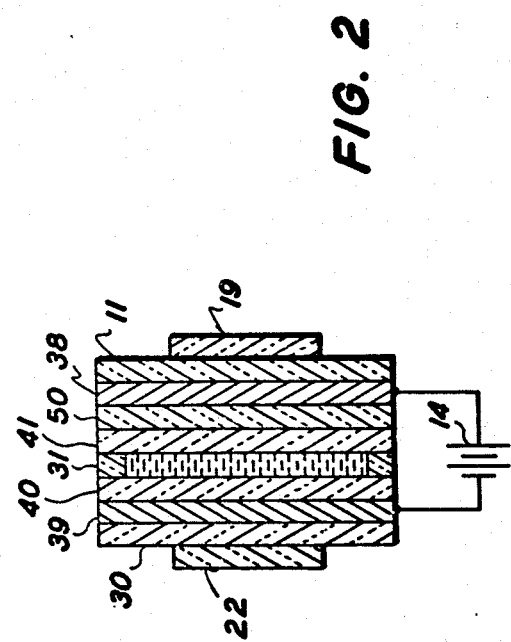
FIG. 2 is a schematic illustration of another embodiment of the present invention.

FIG. 2 illustrates an electro-optic cell in which the electrical field is applied in imagewise configuration to provide a bright image on a dark background.

Like numerals in FIG. 2 refer to like components in FIG. 1. Additionally, photoconductive layer 50 is inserted between conductive coating 38 and the electrically insulating layer 40 comprising a polysiloxane composition.

Photoconductive layer 50 may comprise any suitable photoconductive material. Typical suitable photoconductive materials include photoconductive inorganic materials and photoconductive organic materials. Typical suitable inorganic photoconductive materials include sensitized zinc oxide, for example, sensitized by the addition of Rhodamine Dye, available from DuPont, selenium, selenium alloyed with arsenic such as, for example, arsenic triselenide, tellurium antimony or bismuth; cadmium sulfide, cadmium sulfoselenide, and the many other typical suitable inorganic photoconductive materials listed in U.S. Pat. No. 3,121,006 to Middleton et al. and listed in U.S. Pat. No. 3,288,603, both of which patents are hereby incorporated by reference. Typical suitable organic photoconductive materials include, for example, the combination of 2,5-bis(p-aminophenyl)-1,3,4-oxadiazole available under the trademark TO 1920 from Kalle and Company, Weisbaden-Biebrich, Germany and Vinylite, VYNS, a copolymer of vinyl chloride and vinyl acetate, available from Carbide and Carbon Chemicals Company, and the combination of 2,4,7-trinitro-9-fluorenone to polyvinylcarbazole, available under the trademark Luvican 170 from Winter, Wolf and Company, New York, New York. The thickness of the photoconductive layer 50 is not critical to the practice of the invention. Preferably, the thickness of layer 50 is from about 1 to about 100 microns because enhanced resolution is obtained within that range.

To create an imagewise configuration of electrical field across the nematic liquid crystalline composition, radiation actinic to photoconductive layer 50 is utilized. The actinic radiation is provided in imagewise configuration by suitable means such as, for example, passing the radiation through a mask or stencil. Further, optical image sources such as, for example, a cathode ray tube can be utilized. It will be appreciated, of course, that the elements or layers interposed between the source of actinic radiation and photoconductive layer 50 are selected to be at least partially transmissive to the actinic radiation.

Further, it will be understood that other means of providing an imagewise configured electrical field can be utilized. For example, in FIG. 1 conductive coating 31 may be in imagewise configuration which will result in an imagewise configured electrical field. Although individual electro-optical cells have been described in conjunction with FIGS. 1 and 2, it will be appreciated that grids or bit-matrices can be provided to exhibit the novel effect of the present invention.

The following examples further specifically define the novel method of creating an electro-optical effect, either uniformly or in imagewise configuration. Parts and percentages are by weight, unless otherwise indicated.

EXAMPLE I

The imaging member 10 of FIG. 1 is prepared as follows. Substrates 11 and 30 are glass slides conventionally used to support specimens for microscopic examination. Conductive coatings 38 and 39 are layers of indium dioxide. Layers 40 and 41 are layers of polydimethyl siloxane resulting from air drying of a solution of polydimethyl siloxane in benzene. Spacer 31 is made from an about 1 mil thick piece of Mylar. Layer 13 of nematic liquid crystalline composition having positive dielectric anisotropy comprises a 1:1:1 mixture of p-methoxybenzylidene-p'-trifluoromethylaniline, p-hexyloxybenzylidene-p'-cyanoaniline and p-heptyloxybenzylidene-p'-cyanoaniline. Polysiloxane layers 40 and 41 are about 10 microns thick. The member 10 thus prepared is placed between crossed polarizers.

Without the application of voltage, the field of view between crossed polarizers is black. A variable D.C. voltage source is electrically connected to conductive coatings 38 and 39 and the voltage is steadily, slowly increased with the following observations: upon application of voltage the field of view between crossed polarizers changes from black to dark brown, at 35 volts the liquid crystalline composition begins exhibiting a birefringence and continues to become lighter at higher magnitudes of D.C. voltage.

EXAMPLE II

Example I is repeated except that the polysiloxane layers 40 and 41 are omitted. Initially, between crossed polarizers the field of view is light and birefringence is observed. A variable D.C. voltage source is electrically connected to conductive layers 38 and 39. Upon application of voltage the field of view becomes dark and increases in darkness with increasing applied voltage. At about 50 volts the field of view is substantially completely black.

EXAMPLE III

Example I is repeated except that p-heptyloxybenzylidene-p'-trifluoromethylaniline is substituted for the p-methoxybenzylidene-p'-trifluoromethylaniline in the layer 13 of liquid crystalline composition. The field of view is initially dark and upon application of D.C. voltage begins to lighten. Increasing magnitudes of voltage result in increasing lightening and at about 150 volts D.C. voltage the field of view is substantially completely clear.

EXAMPLE IV

Example II is repeated except that the compositional substitution of Example III is made. The field of view is initially substantially clear and the field of view is birefringent. Upon application of voltage a large portion of the field of view is substantially completely dark; at 100 volts, most of the field of view is dark and at about 200 volts, the field of view is substantially completely dark.

EXAMPLE V

Example I is repeated except that the embodiment depicted in FIG. 2 is made by adding a photoconductive layer 50 comprising polyvinylcarbazole and having a thickness of about 8 microns. The initial field of view is dark between crossed polarizers. During application of voltage, the photo conductive layer is irradiated with light at a wavelength at about 3400A and at an intensity of about $2 \times 10^{10}$ photons/cm$^2$-sec for about 12 seconds. This radiation is provided in imagewise configuration by passing the radiation through a stencil or mask prior to its impinging the photoconductive layer 50. The resulting field of view comprises a light portion in imagewise configuration corresponding to the imagewise configured radiation surrounded by a dark background. The contrast is improved with increasing applied voltages.

EXAMPLE VI

Example III is followed except that the embodiment of FIG. 2 is provided by including a photoconductive layer 50 comprising polyvinylcarbazole. During application of voltage the member is struck with radiation in accordance with the procedures of Example V. The imagewise configured radiation and application of D.C. voltage provides a field of view between crossed polarizers comprising a light portion in imagewise configuration surrounded by a dark portion. The contrast is acceptable at about 50 volts applied voltage, better at about 100 volts applied voltage, and optimum at about 200 volts applied voltage.

It will be appreciated that other variations and modifications will occur to those skilled in the art upon a reading of the present disclosure. These are intended to be within the scope of this invention.

For example, any numerous cell electrode configurations that allow selective addressing of the liquid crystalline material may be utilized, such as the so-called matrix or cross-grid electrode configuration, where non-optical input imaging is desired.

What is claimed is:

1. An electro-optic method, for use with a liquid crystal cell containing between two electrodes a layer of positive dielectric anisotropic nematic liquid crystalline composition, comprising the steps of:
  a. homeotropically aligning said composition by providing a coating of polysiloxane elastomer composition on each electrode and in contact with said layer of liquid crystalline composition; and
  b. applying a voltage between said two electrodes.

2. The method of claim 1 wherein said voltage is a D.C. voltage.

3. The method of claim 1 wherein said voltage is an A.C. voltage.

4. The method according to claim 1, further including between one of said layers of polysiloxane composition and said liquid crystalline composition, a layer of photoconductive material and further including during the performance of step (b) the step of irradiating said layer of photoconductive material with actinic radiation.

5. The method according to claim 4 wherein said layer of photoconductive material has a thickness of about 1 to about 100 microns.

6. The method according to claim 1 wherein said liquid crystalline composition comprises a nematic having positive dielectric anisotropy.

7. The method according to claim 6, wherein said liquid crystalline composition further includes a nematic liquid crystalline composition having negative dielectric anisotropy, wherein said liquid crystalline composition has a net positive dielectric anisotropy.

8. The method according to claim 1, wherein said liquid crystalline composition comprises a smectic liquid crystalline material having positive dielectric anisotropy.

9. The method according to claim 1, wherein said layer of liquid crystalline composition has a thickness from about 1 to about 100 microns.

10. The method of claim 1 wherein at least one of said layers of polysiloxane elastomer composition comprises a polysiloxane homopolymer of the general formula

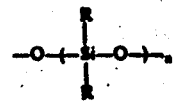

wherein R and R¹ are selected from the group consisting of alkyl and aryl.

11. The method according to claim 1 wherein at least one of said layers of polysiloxane elastomer composition represented by the general formula

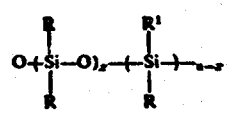

wherein R and R¹ are selected from the group consisting of alkyl and aryl and wherein $R^1 \neq R$.

12. The method of claim 10 wherein said polysiloxane elastomer composition is selected from the group consisting of polydimethyl siloxane, polydiethyl siloxane, polybutyl siloxane, polydiphenyl siloxane, polydinaphthyl siloxane and polydianthryl siloxane.

13. The method according to claim 11 wherein said polysiloxane elastomer composition is selected from the group consisting of polymethylphenyl siloxane, polyethylphenyl siloxane, polybutylphenyl siloxane, polymethylnaphthyl siloxane, polyethylnaphthyl siloxane and polybutylnaphthyl siloxane.

14. An electro-optic method, for use with a liquid crystal cell containing between two electrodes a layer of positive dielectric anisotropic nematic liquid crystalline composition, comprising the steps of:
  a. homeotropically aligning said composition by providing a coating of polysiloxane elastomer composition on each electrode and in contact with said layer of liquid crystalline composition; and
  b. applying an electric field in imagewise configuration across said layers of polysiloxane elastomer composition and liquid crystalline composition in direction normal thereto.

15. The method according to claim 14 wherein said electrical field has an electrical field strength from about $10^3$ to about $10^5$ volts/cm.

16. The method of claim 14 wherein one of said electrodes is in imagewise configuration.

17. The method of claim 14 further including a layer of photoconductive material sandwiched between one of said layers of polysiloxane elastomer composition and said liquid crystalline composition, further including in the performance of step (b) the step of irradiating said layer of photoconductive material with actinic radiation while a voltage is applied between said electrodes.

18. The method of claim 17 wherein said layer of photoconductive material comprises arsenic trisulfide.

19. The method of claim 18 wherein said layer of photoconductive material has a thickness from about 1 to about 100 microns.

20. The method according to claim 19 wherein said layer of liquid crystalline composition has a thickness from about 1 to about 100 microns.

21. The method according to claim 20 wherein said layers of polysiloxane composition have a thickness of about 10 microns.

22. The method according to claim 14 wherein at least one of said layers of polysiloxane elastomer composition comprises a polysiloxane homopolymer of the general formula

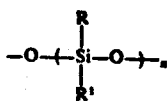

wherein R and R¹ are selected from the group consisting of alkyl and aryl.

23. The method according to claim 14 wherein at least one of said layers of polysiloxane elastomer composition comprises a polysiloxane copolymer represented by the general formula

wherein R and R¹ are selected from the group consisting of alkyl and aryl and wherein $R^1 = R$.

24. The method according to claim 22 wherein said polysiloxane elastomer composition is selected from the group consisting of polydimethyl siloxane, polydiethyl siloxane, polydimethyl siloxane, polydiethyl siloxane, polydibutyl siloxane, polydiphenyl siloxane, polydinaphthyl siloxane and polydianthryl siloxane.

25. The method according to claim 23 wherein said polysiloxane elastomer composition is selected from the group consisting of polymethylphenyl siloxane, polyethylphenyl siloxane, polybutylphenyl siloxane, polymethylnaphthyl siloxane, polyethylnaphthyl siloxane and polybutylnaphthyl siloxane.

* * * * *